(12) United States Patent
Makkinejad

(10) Patent No.: US 9,260,140 B2
(45) Date of Patent: Feb. 16, 2016

(54) COLLISION MEASUREMENT SYSTEM AND METHOD THEREOF

(75) Inventor: Babak Makkinejad, Troy, MI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 774 days.

(21) Appl. No.: 13/528,913

(22) Filed: Jun. 21, 2012

(65) Prior Publication Data
US 2013/0345991 A1 Dec. 26, 2013

(51) Int. Cl.
*B62D 41/00* (2006.01)
(52) U.S. Cl.
CPC ........................ *B62D 41/00* (2013.01)
(58) Field of Classification Search
CPC ........................................... B62D 41/00
USPC ............................................. 702/41
See application file for complete search history.

(56) References Cited

U.S. PATENT DOCUMENTS 7,089,099 B2   8/2006  Shostak et al.
7,786,864 B1   8/2010  Shostak et al.
2002/0099527 A1*  7/2002  Bomar et al. ............. 703/8
2006/0208169 A1*  9/2006  Breed et al. .............. 250/221
2009/0145347 A1*  6/2009  Nakamura et al. ........ 116/216
2009/0261959 A1* 10/2009  Hyde et al. ............... 340/436
2010/0073678 A1*  3/2010  Smith et al. ............... 356/402
2010/0156935 A1*  6/2010  Lim et al. .................. 345/647

OTHER PUBLICATIONS

Lu, Y. et al.; "Photonic Crystal Based All-optical Pressure Sensor"; Jan. 23-27, 2011; pp. 621-624.

* cited by examiner

*Primary Examiner* — Mischita Henson
*Assistant Examiner* — Stephanie Bloss
(74) *Attorney, Agent, or Firm* — Hewlett Packard Enterprise Patent Department

(57) ABSTRACT

Embodiments of the present invention disclose a system and method of collision measurement for a vehicle. According to one embodiment, a plurality of photonic crystals configured to produce a color change state are distributed on an area of the vehicle. Furthermore, a location tag is also positioned on the vehicle for providing mapping data relating to the location of the photonic crystals along said vehicle. Upon receiving external crash impact, a measurement of force is computed based on the color change state of at least one photonic crystal caused by the crash impact.

18 Claims, 5 Drawing Sheets

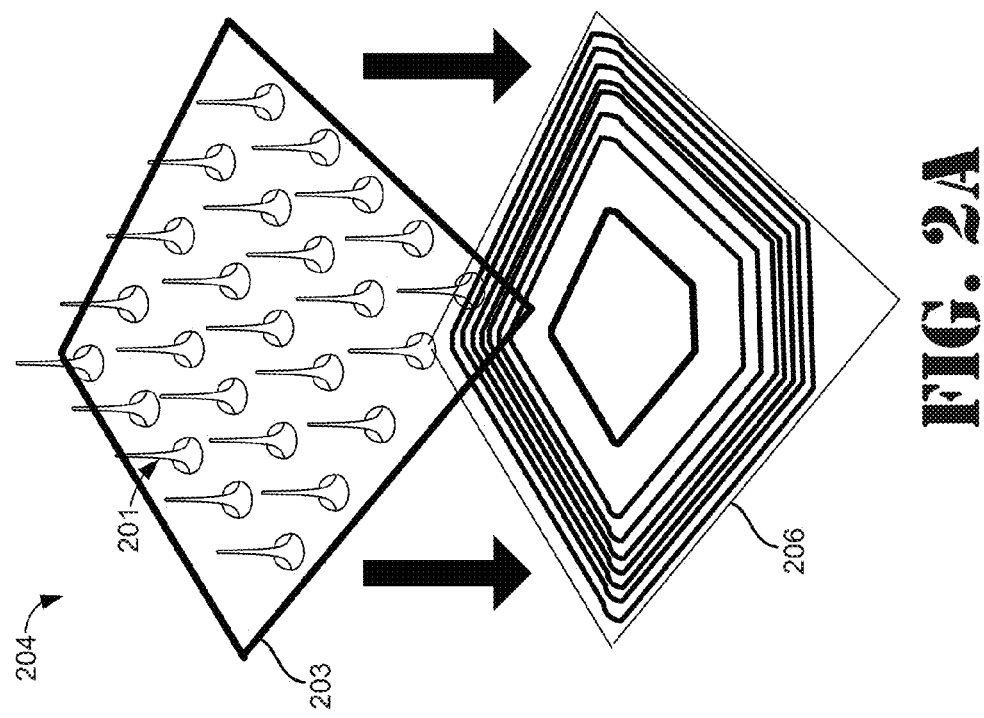
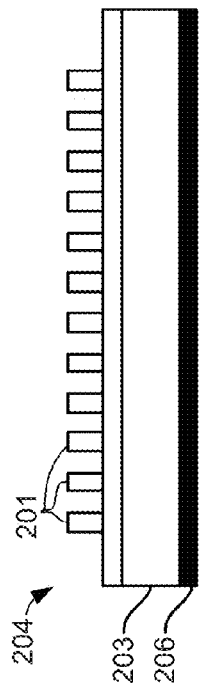
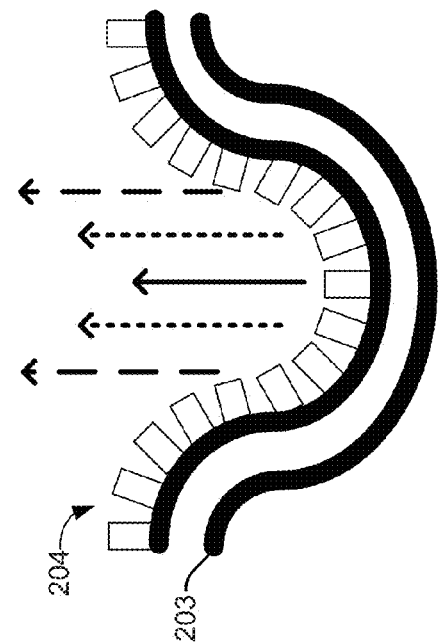
FIG. 2A
FIG. 2B
FIG. 2C

COLLISION MEASUREMENT SYSTEM AND METHOD THEREOF

BACKGROUND

Throughout the years, countless mobile machines or vehicles have been used for the transport of people and/or cargo from one location to another. For example, automobiles, motorcycles, airplanes and watercrafts are a few of most relied upon transport vehicles that pervade today's society. Unfortunately, human error or in some cases, mechanical defects and acts of nature, sometimes lead to roadway or similar accidents involving a physical collision or impact of one vehicle with another vehicle or object. Understanding the forces involved in such circumstances may assist in the development of stronger construction materials for these vehicles in addition to more robust and optimal structural designs that can withstand the forces involved in these collisions more effectively.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIG. 2A is an illustration of a micrographic image relating to a photonic crystal area and a location tag, FIG. 2B is a side view of the photonic crystal bonded to a location tag, while FIG. 2C illustrates light reflection upon deformation of the photonic crystal structure in accordance with example of the present invention.

DETAILED DESCRIPTION OF THE INVENTION

Figure 1:
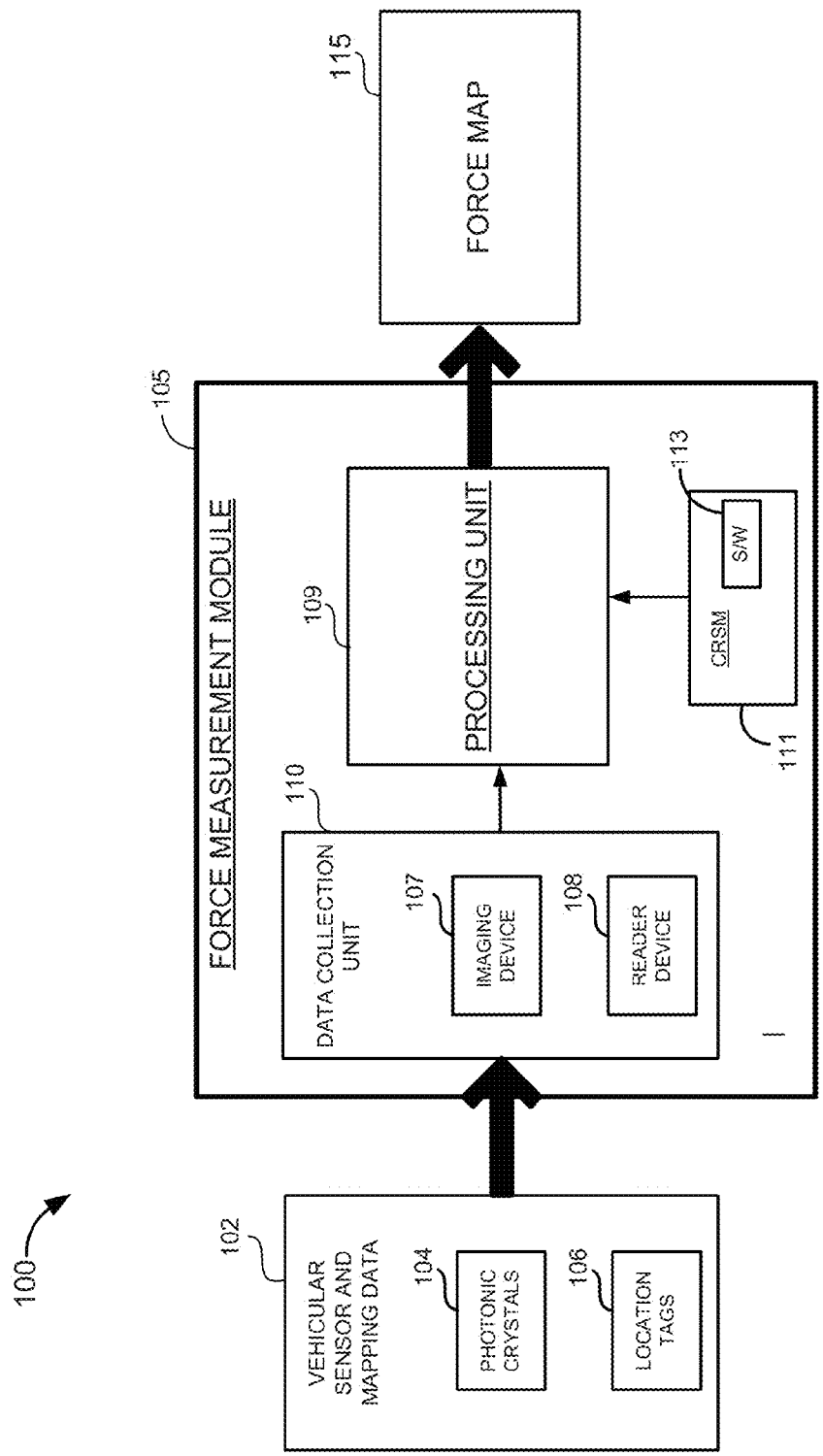
FIG. 1 is a simplified block diagram of the collision measurement system according to an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

According to one example embodiment, a plurality of color-changing photonic crystals are distributed and attached in a suitable manner over the body of a motor vehicle, boat/ship, or aircraft. In addition, location tags are embedded on the associated mobile machine so as to provide positional information for the photonic crystals with respect to said vehicle. In the event of a collision, color change data associated with the photonic crystals along with location information from the location tags may be collected from the body structure. Consequently, a force map of the collision area can be reconstructed based on the change in color of the photon forces relating to the crash. That is, examples of the present invention involve application of a sensor array of photonic crystals to automotive and other mobile vehicle environments for crashworthiness analysis.

Referring now in more detail to the drawings in which like numerals identify corresponding parts throughout the views, FIG. 1 is a simplified block diagram of the collision measurement system according to an example of the present invention. As shown in this example, the system 100 includes vehicular sensor and mapping data 102, a force measurement module 105, and a force map 115. The force measurement module 105 includes a data collection unit 110, processing unit 109, a non-transitory computer-readable storage medium 111, and/or software 113. Vehicle sensor and mapping data includes a plurality of photonic crystals 105 and location tags 106 associated therewith. The photonic crystals 104 may represent a vertical silicon nanowire array membrane-based pressure sensor or similar structure capable of selectively trapping or diffracting light. More particularly, bending of the crystal membrane by external pressure serves to modulate the nanowire pitch and deflection angle of the membrane thus effectuating color change therein as will be described in further detail with reference to FIGS. 2A-2C. Location tags 106 are embedded on the target vehicle and provide positional data of the photonic crystals along the vehicle body. For example, a radio frequency identification (RFID) element may be utilized as the location tag 106.

In one embodiment, processor 109 represents a central processing unit (CPU), microcontroller, microprocessor, or logic configured to execute programming instructions associated with the collision measurement system 100. Data collection unit 110 includes an imaging device 107 and a reader device 108 (though these devices may be combined). Imaging device 107 represents an image capture device—such as a high-fidelity digital camera for example—configured to take pictures of the photonic crystal in facilitating force analysis. The processing unit 109 and/or software 113 may be used to process these digital images and assign force-values (e.g., Pascal or Newton per meter—squared) to those digital images based on calibration values, which may be determined by applying known forces to the photonic crystals and capturing the resultant images for example. The calibrated images can then be compared digitally with the images obtained from the vehicle or collision area so as to infer the forces experienced during actual collision. Reader device 108 represents an RFID reader, bar code reader or similar device configured to capture and/or decode information associated with the location tag.

Storage medium 110 represents volatile storage (e.g. random access memory), non-volatile store (e.g. hard disk drive, read-only memory, compact disc read only memory, flash storage, etc.), or combinations thereof. Furthermore, storage medium 110 includes software 112 that is executable by processor 104 and, that when executed, causes the processing unit 104 to perform some or all of the functionality described herein. For example, force measurement and the generation of a force map may be implemented as executable software within the storage medium 110.

FIG. 2A is an illustration of a micrographic image relating to a photonic crystal area and a location tag, FIG. 2B is a side view of the photonic crystal bonded to a location tag, while FIG. 2C illustrates light reflection upon deformation of the photonic crystal structure in accordance with example of the present invention. As described above, photonic crystal structure 204 may represent a vertical silicon nanowire array based pressure sensor or similar structure capable of selectively trapping or diffract light. The photonic crystal area 204 may be bonded with a location tag such as RFID tag 206 for example (though bonding step may be omitted). As shown in FIG. 2B, the photonic crystal structure 204 includes a vertical nanowire structure 201 and a lower membrane 203. According to example, the lower membrane 203 of the photonic crystal structure 204 may be bonded with a location tag 206 on a side opposite the side having formation of the vertical nanowire array 201. Turning now to FIG. 2C, as external pressure bends the membrane 201, the photonic crystal structure 204 undergoes a color change due to the modulation of the nanowire pitch and deflection angle. That is, the viewing angle of the nanowire array is modulated by the deformation such that light reflection becomes wavelength dependent. As shown here, the various arrow patterns (solid, long-spaced, short-spaced) represent different colors reflecting visible lights at different wavelengths. In addition, by acquiring the membrane image with a digital camera, the color image can be cross-correlated with a calibration data set to calculate the relative impact pressure.

Figure 3A:
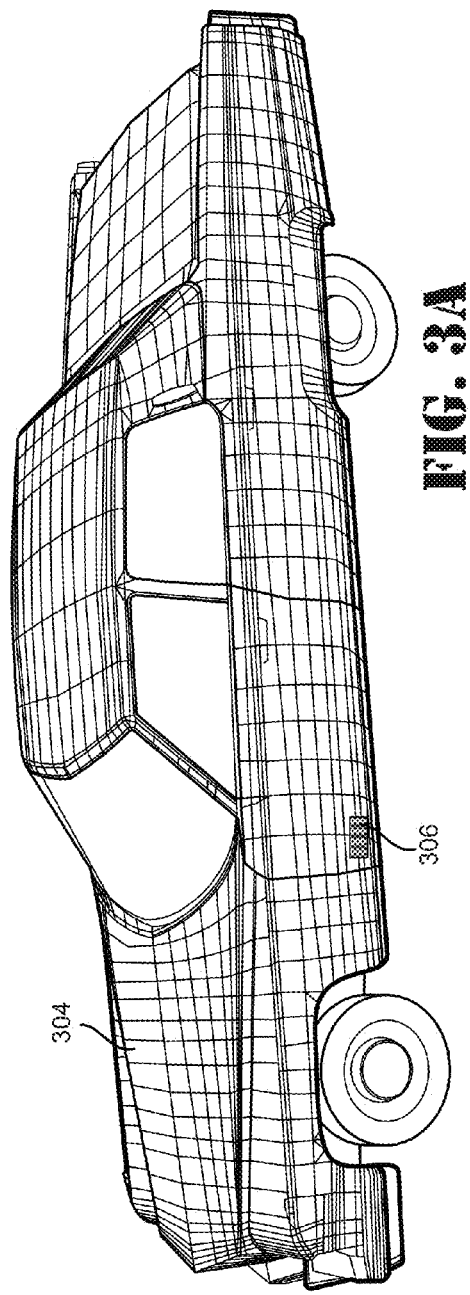
FIGS. 3A and 3B are three-dimensional and top down views of a vehicle equipped with a photonic crystal structure according to an example of the present invention.
Figure 3B:
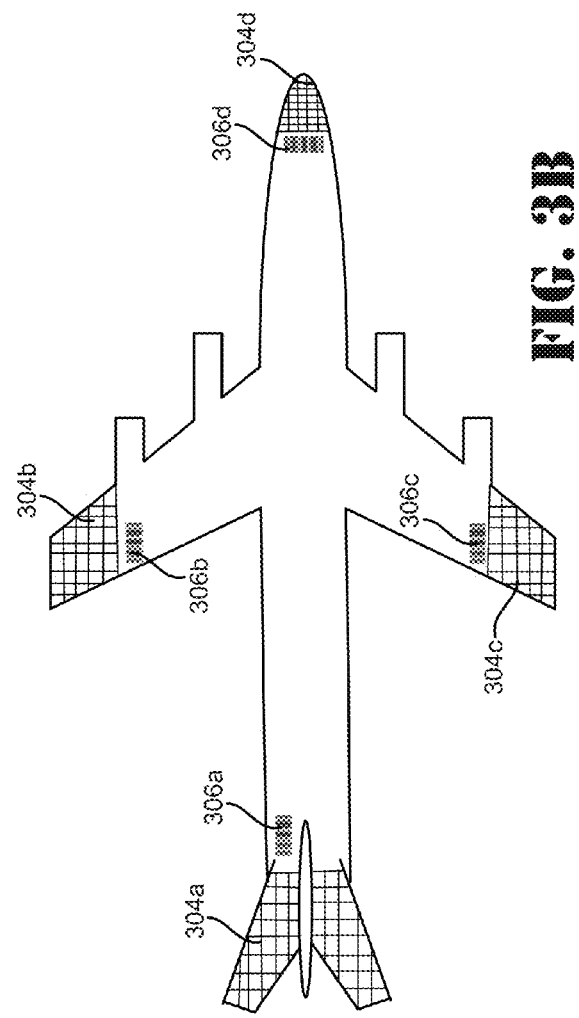

FIGS. 3A and 3B are three-dimensional and top down views of a vehicle equipped with a photonic crystal structure according to an example of the present invention. FIG. 3A depicts an automobile having a plurality of photonic crystals 304 formed thereon. In one example, a coordinated-mesh of photonic crystals 304 are distributed over and attached to the entire periphery of the vehicle's body so that the distribution of forces on the body during collision can be measured. The mesh of photonic crystals 304 may be created for various areas of application such as ground transportation, sea transportation, and aerial transportation. For each application area, the force/pressure may be constrained to a specific range of forces/pressures that are experienced in that application domain. For example, FIG. 3B depicts the coordinated-mesh of photonic crystals 304 formed only on specific areas (e.g., high probability impact areas) of the vehicle (i.e., aircraft) rather than the entire periphery and shown and described in FIG. 3A.

As described above, the collision measurement system utilizes at least one location tag 306 for providing positional reference information of the photonic crystals. In one implementation, an RFID element serves as the location tag and is configured to store mapping data relating to the location of a photonic crystal structure on the vehicle frame/body with respect to a particular coordinate system (identity vehicle/ship/airplane identity may also be utilized). This information could then be acquired using an RFID reader post-collision.

According to an example embodiment, the photonic crystal structure and location tag(s) are separate entities and the proper functioning of each is not dependent on the existence of any sort of coupling with one another. More particularly, the location tags are used to provide reference positioning for the photonic crystals on the vehicle so that a post-crash force map associated with deformations of the vehicle's body (e.g., fuselage) may be constructed. In accordance with one example embodiment, the photonic crystal structure and location tag (e.g., RFID) are attached or mounted on the same physical substrate and then attached to the body of the vehicle. The location tags may be attached anywhere along the body that is deemed suitable by manufacturers and/or safety engineers, or based on application and context. That is, the location tags may be distributed differently on an aircraft than on a motorcycle for example.

Alternatively, the same functionality could be achieved via barcoding of location information on an area of the vehicle together with mounting of the photonic crystals. In lieu of an RFID tag, this information may be encoded via a two-dimensional bar-code (e.g., 306a-306d) on or near the photonic crystal and scanned via a suitable bar-code scanner/reader. Appearing like a colored sticker in one example, the bar-coded location tag may be fabricated in photosensitive polymers via multi-beam interference lithography. Moreover, each bar-coded location tag 306a-306d may refer to a location of a particular section of photonic crystals 304 on the vehicle body. Referring to FIG. 3B, location tags may relate to various sections of the photonic crystal structure with respect to the fuselage. For example, location tag 306a may provide positional information of the photonic crystals 304a formed on the tail end, location tag 306b and 306c may provide positional information of the photonic crystals 306b and 306c formed on the left and right wings respectively, while location tag 306d provides positional information of the photonic crystals 304d formed on the cockpit of the vehicle's fuselage. Once the forces are estimated, a stress map may be constructed over the body of the vehicle that indicates the distribution of forces during collision or impact. Such information could then be used to further investigate the crashworthiness including the construction material related to the vehicle of interest.

Figure 4A:
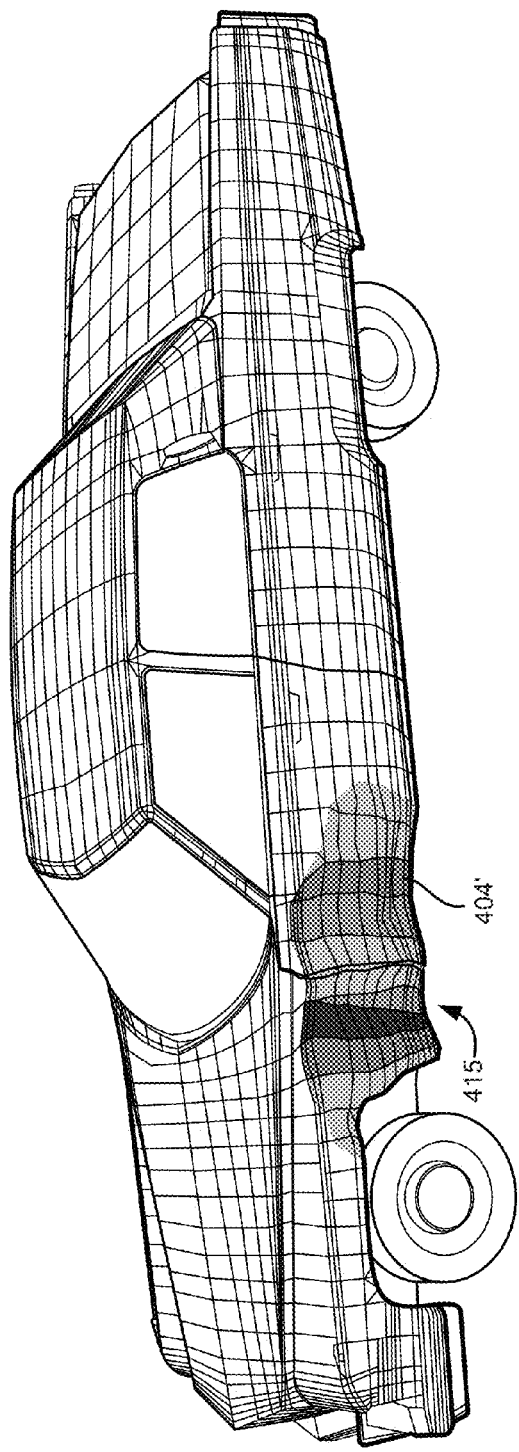
FIGS. 4A and 4B are illustrations of force maps highlighting deformations arising from a collision according to an example of the present invention.
Figure 4B:
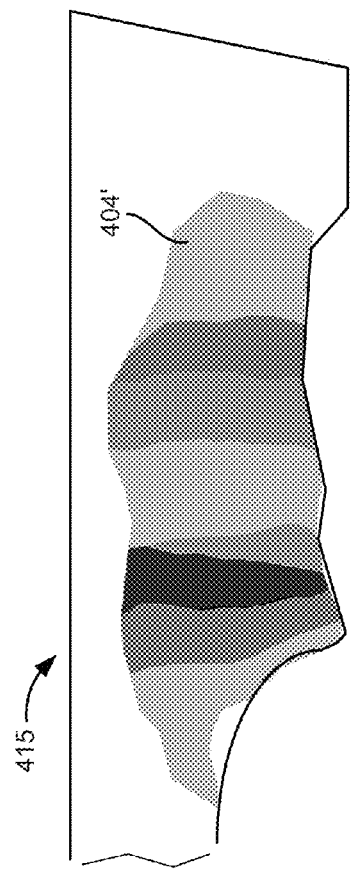

FIGS. 4A and 4B are illustrations of force maps highlighting deformations arising from a collision according to an example of the present invention. Determining the correspondence of the photonic color change to the applied force/pressure may involve a calibration step performed during the design and manufacturing process of the photonic crystals. As pressures increases, a color pattern on the photonic crystals is altered, which may directly relate to quantitative measurement of forces. Moreover, a number of photonic crystals may be destroyed or dislodged during a vehicular collision, causing gaps in the data that is collected and analyzed. In such cases, statistical methods of data interpolation and extrapolation could be applied by the processing unit to infer the values of the missing data points. FIG. 4A depicts a three-dimensional force map 415 of a collision area 404' involving deformed photonic crystals. As seen here, the various color shades are indicators of different levels of displacement and light reflection caused by the collision and deformation of the photonic crystal structure. Similarly, FIG. 4B depicts an alternate two-dimensional force map image 415 of the same collision area 404' shown in FIG. 4A. This force map 415 may be used in further analysis of the crash-worthiness of the structure and its composition. For example, the darker section of the collision area 404' may be an indicator of an area of substandard construction or an area of the vehicle that needs to be reinforced.

Figure 5:
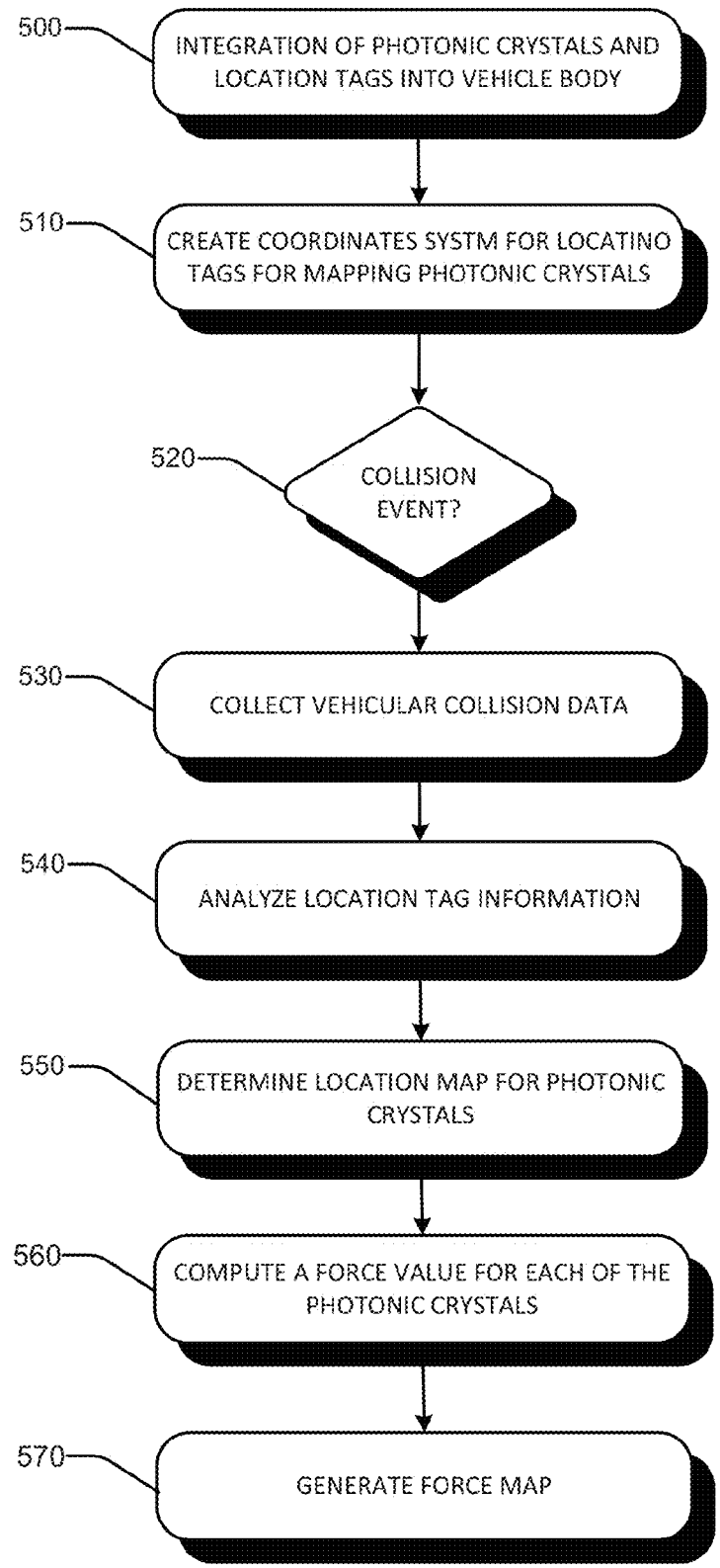
FIG. 5 a simplified flow chart of the processing steps for collision measurement according to an example of the present invention.

FIG. 5 a simplified flow chart of the processing steps for collision measurement according to an example of the present invention. As an initializing step 500, the photonic crystals and location tags are integrated and formed on the vehicle body. Next, in step 510, a preferred coordinate system is created that maps a position of the photonic crystal structure on the vehicle body. Upon the occurrence of a crash event in step 520, collision data including the photonic crystals and location tags are collected by the data collection unit in step 530. For instance, the location tags may be read by a RFID reader or barcode scanner, while an optical sensor (e.g., digital camera) is utilized to image a collision area of the vehicle and associated photonic crystals. Thereafter, in step 540, the location tag information is identified by the processing unit. Consequently, the preferred coordinate system is referenced from the location tag information in step 550 so as to create a map of the photonic crystals on the target vehicle. In step 560, the images of the photonic crystals are analyzed and force values are computed based on identified color changes to the photonic crystals. Lastly, in step 570 a force map is generated based on the force values calculated by the processing unit.

Embodiments of the present invention provide a number of photonic crystals distributed over a vehicular body for the purpose of measuring the forces of the crash. According to one example embodiment, alteration to the color change threshold of photonic crystal structures are configured to correspond to the range of forces/pressures experienced in crashes of the associated vehicle (e.g., automobile, boat/ship, and/or aircraft). Force or impact measurement for these mobile vehicles may aide in the development of better materials and/or construction designs in an effort to reduce the number of death and injuries caused by such collisions or crashes.

Furthermore, while the invention has been described with respect to exemplary embodiments, one skilled in the art will recognize that numerous modifications are possible. For example, although exemplary embodiments depict an automobile and airplane as the represented mobile vehicle, the invention is not limited thereto. For example, the target vehicle may be a bicycle, motorcycle, ship, boat, hovercraft, submarine, or any other transport vehicle/device capable of having a plurality of photonic crystal structures integrated within the frame or body thereof. Thus, although the invention has been described with respect to exemplary embodiments, it will be appreciated that the invention is intended to cover all modifications and equivalents within the scope of the following claims.

What is claimed is:

1. A system for a vehicle comprising:
   a plurality of photonic crystals distributed on an area of the vehicle and configured to produce a color change state; and
   at least one location tag bonded to the area having the plurality of photonic crystals and positioned on the vehicle, wherein the at least one location tag is configured to store and provide mapping data relating to a location of the plurality of photonic crystals on the vehicle,
   wherein upon receiving an external impact, a measurement of force is computed based on the color change state of at least one photonic crystal caused by the external impact and the mapping data of the plurality of photonic crystals that provides a reference positioning of the plurality of photonic crystals on the vehicle is used to construct a post-crash force map associated with a deformation of a body of the vehicle caused by the external impact.

2. The system of claim 1, further comprising:
   an imaging device configured to capture the color change state associated with at least one photonic crystal; and
   a reader device configured to detect the mapping data associated with the at least one location tag.

3. The system of claim 2, further comprising:
   a processing unit configured to analyze the location of the plurality of photonic crystals and the color change state of the plurality of photonic crystals in order to generate a stress map that indicates a distribution of forces over the vehicle.

4. The system of claim 1, wherein the vehicle is an automobile, a motorcycle, an aircraft, or a watercraft device.

5. The system of claim 1, wherein the plurality of photonic crystals is only distributed on specific areas.

6. The system of claim 1, wherein the plurality of photonic crystals is distributed over an entire body of the vehicle.

7. The system of claim 1, wherein the at least one location tag is a radio frequency identification (RFID) element.

8. A method for collision measurement comprising:
   collecting vehicular collision information associated with a vehicle, wherein the vehicular collision information includes color change data associated with a plurality of photonic crystals configured to produce a color change state and location information from at least one location tag bonded to each area having the plurality of photonic crystals, wherein the at least one location tag is configured to store mapping data relating to the location of the plurality of photonic crystals formed along the vehicle;
   analyzing the color change state and the mapping data collected from the vehicular collision information;
   computing a measurement of force caused by a collision impact based on the mapping data and the color change state of the plurality of photonic crystals; and
   constructing a post-crash force map associated with a deformation of a body of the vehicle caused by the collision impact based on the mapping data of the plurality of photonic crystals that provides a reference positioning of the plurality of photonic crystals on the vehicle.

9. The method of claim 8, further comprising:
   capturing, via an imaging device coupled to a processing unit, the color change state associated with at least one photonic crystal;
   capturing, via a reading device coupled to the processing unit, the mapping data associated with the at least one location tag.

10. The method of claim 9, further comprising:
    determining a force value for each of the plurality of photonic crystals based on the color change state of a respective one of the plurality of photonic crystals; and
    generating, based on the force value for each of the plurality of photonic crystals, a stress map that indicates a distribution of forces over the vehicle.

11. The method of claim 8, wherein the vehicle is a motor vehicle, an aircraft, or a watercraft device.

12. The method of claim 8, wherein the plurality of photonic crystals is only distributed on specific areas.

13. The method of claim 8, wherein the plurality of photonic crystals is distributed over an entire body of the vehicle.

14. The method of claim 8, wherein the at least one location tag is a radio frequency identification (RFID) device.

15. A system for a vehicle comprising:
a plurality of photonic crystals distributed along the vehicle and configured to produce a color change state;
at least one location tag bonded to each area having the plurality of photonic crystals and positioned on the vehicle, wherein the at least one location tag is configured to provide mapping data relating to a location of the plurality of photonic crystals along the vehicle;
an imaging device configured to capture the color change state associated with the plurality of photonic crystals;
a reader device configured to detect the mapping data associated with the at least one location tag; and
a processing unit configured to analyze the location of the plurality of photonic crystals and the color change state of the plurality of photonic crystals in order to generate a post-crash force map that indicates a distribution of forces over the vehicle based on the mapping data of the plurality of photonic crystals that provides a reference positioning of the plurality of photonic crystals on the vehicle,
wherein upon receiving an external impact, a measurement of force is computed based on the color change state of at least one photonic crystal caused by the external impact.

16. The system of claim 15, wherein the vehicle is an automobile, a motorcycle, an aircraft, or a watercraft device.

17. The system of claim 15, wherein the plurality of photonic crystals is only distributed on specific areas.

18. The system of claim 15, wherein the at least one location tag is a radio frequency identification (RFID) device.

* * * * *